June 21, 1960
A. F. LOEFFLER
2,942,155
LOAD-PICKUP REPEATING CIRCUIT INTERRUPTER
Filed Dec. 17, 1956
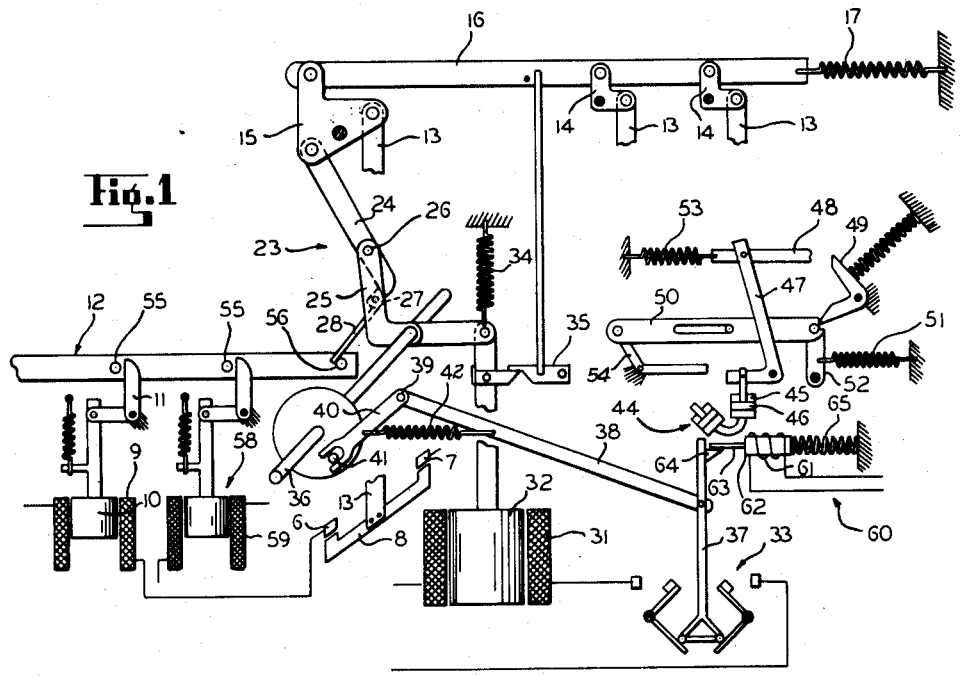
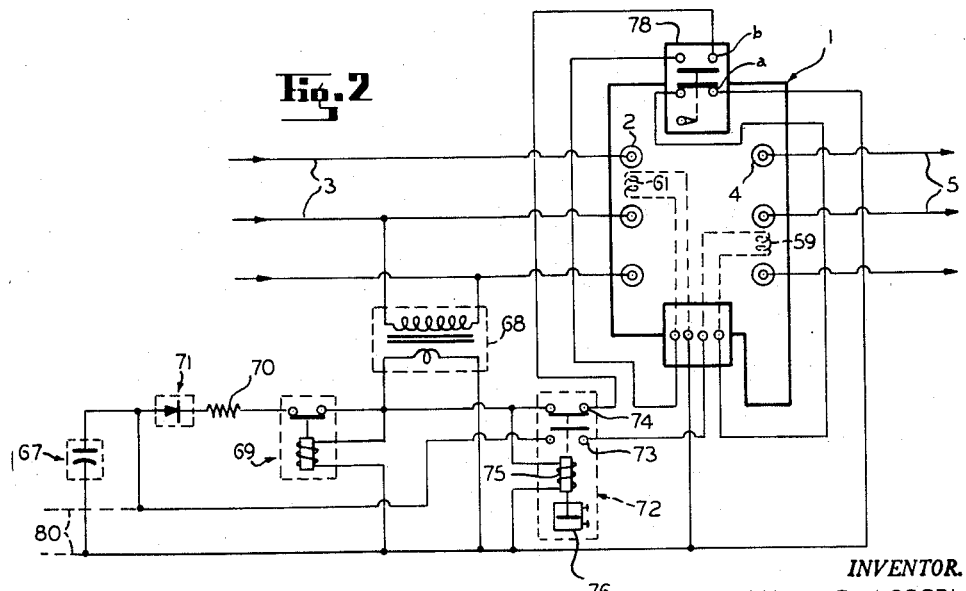
*INVENTOR.*
ALVIN F. LOEFFLER
BY Ralph H. Hohenfeldt
ATTORNEY

United States Patent Office 2,942,155
Patented June 21, 1960

2,942,155

LOAD-PICKUP REPEATING CIRCUIT INTERRUPTER

Alvin F. Loeffler, South Milwaukee, Wis., assignor to McGraw-Edison Company, a corporation of Delaware Filed Dec. 17, 1956, Ser. No. 628,751

12 Claims. (Cl. 317—22)

This invention pertains generally to circuit interrupters which open in response to the flow of excess current and automatically reclose a predetermined number of times until the fault is cleared or until the interrupter locks open. More particularly, the invention relates to an interrupter of this class modified so that it also responds to disappearance of voltage from a power line by automatically disconnecting the load after a selected time interval and by reconnecting the load after another time interval following restoration of voltage on the line so that in a scheme using comparable interrupters the load may be picked up in increments after an outage.

In modern distribution systems, if the source of power is lost for even a short time, loss of diversity may be so great that the whole load cannot be re-energized without first sectionalizing the system into lesser load increments, and then re-energizing these consecutively. By loss of diversity is meant that the various power consuming appliances connected to the system all demand power at the same time instead of periodically or at random as is the case under normal operating conditions. Thus, when power is restored there is a high initial inrush current which tends to subside only after the charging current has been supplied and the various appliances have had an opportunity to complete an operational cycle whereupon load diversity is regained.

When high inrush currents occur, a number of problems arise. Among them is that the automatic circuit interrupters protecting the line sense the inrush current as a flow of fault current, thereby causing the interrupter to open and further perpetuate the outage. In aggravated cases it is necessary to break the distribution system into sections and energize the sections one by one in order to avoid exceeding the trip rating of the protective interrupter.

It has been proposed in the prior art to solve the problems outlined in the preceding paragraph by locating automatic sectionalizing switches at various points in the distribution system in series arrangement with a back-up protective circuit breaker so that when power is restored by closing the breaker, a sectionalizing switch nearest the source will automatically reclose after a time interval and energize the next adjacent line section and the next sectionalizing switch so that the load connected to the sections may be gradually picked up. Another scheme is to locate a sectionalizing switch in each branch line and adapt them to reclose in random or at definite time intervals after they again receive power from the main line. However, such sectionalizing switches are generally designed for the specialized duty of opening only when their feeder line is de-energized without providing any fault protection for the lines. Hence, it is still necessary that the system be provided with fault responsive circuit interrupters, of adequate interrupting capacity, in addition to the plurality of sectionalizing switches that aid in picking up the load after an extended outage.

It is an object of the present invention to provide a circuit interrupter that facilitates reconnecting an electrical load in increments following loss of source voltage for an extended period.

Another object of this invention is to provide an interrupter that automatically opens and recloses in response to temporary faults in a power system and that locks open if the fault is permanent, and, in addition, that automatically disconnects its load from the source if the source voltage is lost for a predetermined time and reconnects its load after voltage is restored for a predetermined time.

A further object is the provision of an interrupter that may be used in parallel with others like it to deliver power from a common source to a plurality of distinct electrical load sections where an interrupter protects each load section against faults during prevalence of source voltage but which disconnects all load sections if the source voltage fails for a predetermined time and again connects the load sections consecutively after source voltage is restored so that the source is not burdened simultaneously with the cumulative inrush current of the individual load sections.

A still further object is the provision of an interrupter that may be arranged to automatically disconnect a power system into series sections after a prolonged loss of source voltage and sequentially reconnect said sections following a restoration of voltage at the source.

A further object is to provide an auxiliary tripping arrangement which independently trips the interrupter when source or line voltage is not available but which does not interfere with the normal fault protection duty of the interrupter.

It is a general object to provide an improved load-pickup circuit interrupter, and more specific objects will appear periodically throughout the course of this specification.

A typical, but not exclusive, form of circuit interrupter which may be modified to incorporate load-pickup features is illustrated in the copending application of A. Van Ryan et al., Serial No. 379,046, filed September 8, 1953, now Patent No. 2,804,521 issued August 27, 1957, and assigned to the assignee of the instant invention.

The cited patent application illustrates in great detail a polyphase circuit interrupter, which is schematically illustrated in the instant application, and modified according to the invention. More specifically, the present invention involves a repeating circuit interrupter that includes separable bridging switch means for connecting an electric load to a power line. The interrupter by itself is substantially self-contained in an oil-filled tank that has a set of insulating bushings connected to the source and another set of bushings which are connected to the load. The interrupter is provided with switch opening means in the form of mechanism driven by a stored energy spring and switch reclosing means including an electromagnetic operator which closes the switch means and stores energy in the spring simultaneously. There is a general latch means for holding all switches of the individual phases in closed circuit position under normal conditions and a trip means which causes collapse of the latch so that the opening spring may act. Response of the interrupter to the flow of excess power in the load line is achieved by an overload relay having a coil connected in series with a main switch in each phase. After the series relays have responded to flow of fault current by opening the switch means, the shunt electromagnet is energized for the purpose of reclosing the switches and loading the opening spring. The shunt electromagnet is energized by line voltage and is disconnected immediately after the switches are closed.

Lockout means are also provided for holding the switch means open in the event that a fault is not cleared during a quick succession of opening and reclosing operation. Cumulative means are provided for counting the interrupter operations and rendering the lockout means effective after a predetermined number of operations.

The present invention modifies the interrupter just briefly outlined by combining with it a second trip means adapted to release the general latch means and permit opening of the switch if the source power fails for a period of time which is governed by an adjustable time delay device. Blocking means, controlled by the time delay device, are also provided for maintaining the reclosing means inactive until expiration of a predetermined time delay period following restoration of power on the source line. The blocking means are part of the interrupter but they do not interfere with its reclosing operation while responding to fault currents, that is, if the blocking means are energized.

In order to provide power for tripping the interrupter after source voltage has failed, the invention features, in one embodiment, a capacitor which stores energy under normal conditions and which releases that energy for the purpose of operating the second trip means when source voltage is unavailable.

A further form of the invention eliminates the capacitor circuit and relies upon an independent source of power for tripping the interrupter after the line voltage has disappeared.

A more detailed description of the novel load-pickup circuit interrupter will be set forth in connection with the following drawings in which:

Fig. 1 illustrates the principal components of a repeating circuit interrupter and also includes a schematic representation of certain elements which impress the interrupter with load-pickup features; and, Fig. 2 is a wiring diagram of the interrupter and the auxiliaries required to adapt the same to gradually picking up load after an extended outage.

Before discussing adaptation of the interrupter for load—pickup duty, the conventional fault protective features of the interrupter will be outlined primarily in reference to Fig. 1. It will be understood that the components shown in Fig. 1 are all housed in a metal tank, see Fig. 2, that supports source side insulating bushings 2, for connecting the polyphase line wires 3 to the interrupter; and load side bushing 4, for connecting the interrupter to the load wires 5. Within the interrupter there are interrupting switch means comprising pairs of stationary contacts 6, 7 in each phase arranged to be bridged by a movable contact 8, and in series with respective contacts 6, 7 and 8 there is an overload relay coil 9. One end of overload coil 9 connects to a source wire 3 through bushing 2 interiorly of tank 1 and stationary contact 7 is connected to load wire 5 through bushings 4 so that when the interrupter is closed there is a series circuit originating at load wires 3, through coil 9, across contacts 6 and 7 through bridging contact 8, and out through bushings 4 where it terminates with load wires 5.

Overload relay coil 9 comprises a comparatively few turns of wire heavy enough to conduct the load current without undue heating during normal operation. When traversed by excessive current, the series overload relay coils 9 are adapted to attract a plunger 10 downwardly for the purpose of rotating a bell crank trip lever 11 which acts on a common trip bar 12 to open all phases of the interrupter in a manner which will be described shortly hereinafter.

The bridging switches 8 are arranged to open simultaneously and disconnect all phases whenever an overload occurs in any phase. To achieve this, the insulating links 13 supporting the bridging switches 8 are in turn supported on individual bell cranks 14 and 15 jointly carried on a suitably guided power bar 16. Movement of power bar 16 to the right in Fig. 1 causes the individual bell cranks to rotate on their fixed pivots, shown sectioned, through a clockwise angle which results in the bridging switches 8 being opened. When the interrupter is in closed circuit position, power bar 16 is biased strongly to the right by means of a switch opening spring 17 that is normally held inactive and in an extended condition by a toggle link assembly 23 which anchors the power bar 16 against lateral movement by holding bell crank 15 against rotation.

The toggle link assembly 23 or general latch means includes a first link 24 which is connected to bell crank 15. A second L-shaped link 25 is pivotally connected at 26 intermediate the ends of link 24 and the two links 24 and 25 are locked with respect to each other when the toggle is made by means of a semi-cylindrical rotatable latch shaft 27 from which a toggle trip finger 28 extends. The toggle is biased towards collapsing by force derived from opening spring 17 and transmitted through the power bar 16 and bell crank 15 but it is restrained against collapsing by link 24 bearing on the semi-cylindrical latch. When semi-cylindrical latch 28 is rotated in a clockwise direction, the tip of toggle link 24 is able to clear the flat side of the latch 27 and permit a quick retraction of the power bar to the right by opening springs 17. This causes bridging switch means 8 to be driven downwardly at a very high speed and to open the various phases.

The interrupter is reclosed by means of a resetting electromagnet including a shunt connected coil 31 and a magnetic metal plunger 32. Coil 31 is connected interiorly of tank 1 across any two of the bushings 2 on the source side of the interrupter and in series with a reclosing control switch 33. When the toggle assembly 23 collapses incident to opening the interrupter as just described, resetting plunger 32 is retracted upwardly by means of a spring 34 after latch 35 releases the plunger by reason of power bar 16 carrying the latch to the right. When the bridging switches 8 are fully open and resetting plunger 32 has reached its uppermost position, reclosing switch 33 is automatically closed, by means to be described, so that shunt coil 31 can be energized for again drawing resetting plunger 32 downwardly. This causes the toggle 23 to be made so that the bridging switches 8 may be reclosed and the opening spring 17 reloaded simultaneously. After the interrupter has automatically reclosed in this manner, plunger 32 is held downwardly by a latch finger 35 operated from the power bar 16 as shown.

The resetting electromagnet 31 is de-energized after the interrupter is reclosed by opening the reclosing switch 33. This is accomplished by the changing angular positions of a shaft 36 which rotates with the L-shaped arm 25 of the toggle link assembly and moves in accordance with positions of the plunger 32. It will be seen that shaft 36 is connected to an insulating link 37 of the reclosing control switch 33 by means of a long metal link 38 pivotally joined at 39 to a bifurcated link 40. The bifurcated link 40 engages a crank pin 41 which rotates with shaft 36. Links 38 and 40 are joined at opposite sides of their pivot connection 39 by an overcenter tension spring 42. When crank pin 41 rotates counterclockwise during switch opening, that is, when plunger 32 rises, the link pin 39 is moved to a position beneath the line of action of spring 42 thereby causing the long link 38 to execute a rapid counterclockwise movement which lifts insulating link 37 of the reclosing switch 33 and completes the circuit momentarily through the reclosing electromagnet coil 31. When the plunger 32 of the resetting electromagnet descends, the line of action of spring 42 is transferred to the position in which it is depicted in Fig. 1 whereupon the reclosing switch 33 is again opened and the coil 31 in series with it is de-energized.

In practice, the number of switch opening and reclosing operations is limited ordinarily to four, and if these operations occur in close succession the interrupter is adapted to lock out permanently until manually reset. Although the lockout means are not shown in great detail it will be seen to comprise a hydraulic pump 44 which is adapted to execute a stroke each time the interrupter opens. Any mechanical arrangement may be utilized for actuating the pump 44 by force derived from the opening spring 17. Each time pump 44 strokes, a quantity of fluid is forced into a cumulative cylinder 45 in which an integrating piston 46 is adapted to advance upwardly in a step-by-step manner while at the same time rotating a bell crank 47 that advances a lockout bar 48 in steps to the right. Lockout bar 48 is arranged to ultimately strike a latch lever 49 and cause lockout now to be described.

The lockout means also includes a sliding link 50 which is biased toward the right against the action of lockout latch 49 by means of a tension spring 51 acting on an anchored pivot lever 52. When the lockout latch 49 is struck by lockout bar 48 as explained earlier, sliding link 50 moves to the right and causes a crank 54 to rotate in a clockwise direction so that it may depress insulating link 37 extending from reclosing switch 33. It is thus seen that automatic reclosure is prohibited and lockout is effected by holding the reclosing switch 33 open and thereby preventing reclosing electromagnetic coil 31 from being energized. After lockout persists for an extended period, lockout bar 48 is retracted toward the left by means of a resetting spring 53 which acts through bell crank 47 to resettle integrating piston 45 and prepare it for another series of counting operations after lockout latch 49 is manually reset against sliding bar 50.

Attention is again invited to the means for tripping the toggled main or general latch means 23 by rotation of semicylindrical latch 27. As indicated earlier, whenever series overload coil 9 is traversed by current in excess of its trip value, solenoid plunger 10 is attracted downwardly to cause rotation of bell crank 11 that is adapted to strike one of a plurality of pins 55 extending from the common trip bar 12. At one end of trip bar 12 there is another pin 56 extending into the path of the finger 28 projecting from semi-cylindrical latch 27. It is obvious that if trip bar 12 is moved to the left, semi-cylindrical latch 27 will rotate in a clockwise direction by reason of pin 56 striking finger 28 and link 24 will pass semi-cylindrical latch 27 so the toggle 23 may collapse and thereby open the interrupter.

It will be recalled that in the fault protective interrupter outlined thus far there is a series overload trip relay 9 for each phase and that each acts upon the common trip bar 12. In addition to that, when the interrupter is modified for load pick-up, there is a second trip means or relay, designated generally by the reference numeral 58, for the purpose of tripping the interrupter by acting on the trip bar 12 when there is no overload current available or when voltage has disappeared from the source line wires 3. In practice, the second trip means may take any form but it is here illustrated as being comparable in design to the series overload relays except that its magnet coil 59 is shunt-wound, that is, it has many turns of a comparatively fine wire so as to limit the current which it draws when subjected at a proper time to the control voltage brought into play when voltage disappears on the source line wires.

Another element which is added to the basic interrupter for the purpose of adapting it to picking up load after an extended outage is a shunt blocking relay assembly, designated generally by the reference numeral 60, and normally mounted within the interrupter tank 1. Blocking relay 60 includes a magnet coil 61 and plunger 62 from which a detent 63 extends into engagement with a tongue 64 carried by the insulating link 37 of the reclosing switch 33. Plunger 62 and the detent 63 are biased toward engagement with the reclosing switch link 37 by means of a compression spring 65. It is readily apparent that blocking relay 60 engages the reclosing switch link 37 when the magnet coil 61 is deenergized and that the switch link 37 is disengaged when the blocking relay coil 61 is energized.

All of the structure thus far described may be mounted within the tank 1 housing the interrupter. The description will now proceed with an explanation of the additional devices which are necessary for modifying the interrupter so that it may perform load-pickup duty. Although the whole combination load-pickup switch and load interrupter might be constructed as a single unit within a single housing such as tank 1, the manner of illustrating it as in Fig. 2 has been chosen to suggest how an existing interrupter of this type may be conveniently modified for load-pickup or sectionalizing duty.

In order to trip the interrupter open when the source lines 3 are dead, one form of the invention is provided with a capacitor 67, see Fig. 2, which is charged while the source is alive from a step-down transformer 68 whose primary is connected to the power line and whose secondary is arranged to impress a voltage on the capacitor 67 through an instantaneous dropout relay 69, a current limiting resistance 70, and a rectifier 71. During normal circuit operation, instantaneous relay 69 remains closed and maintains a full control voltage charge upon the tripping capacitor 67. When voltage on the source fails, however, instantaneous relay 69 drops out and isolates the charged capacitor from the secondary of step-down transformer 68. So that capacitor 67 may discharge through the coil 59 of the second trip means 58 after a time delay following disappearance of voltage from the source line 3, one side of the capacitor 67 is connected to the lower normally open contact 73 of a time delay relay designated generally by the reference numeral 72. Relay 72 is preferably of a type which time delays in two directions and which transfers suddenly following expiration of either of its time delay periods. Time delay relay 72 is operated by a coil 75 connected directly across the secondary of the control transformer 68. Hence, when there is sustained voltage on the source wires 33, the contacts 74 are closed, and when voltage has disappeared, contacts 73 close following expiration of the downward time delay period. Conversely, when the power source has been dead for a period of time, the time delay relay will be at rest in its lowermost position and will transfer to its uppermost position as shown in Fig. 2 following return of voltage and expiration of a second time delayed period. The delay in both directions may be adjusted by means such as needle valves extending from the dashpot 76.

After the power lines 3 have been de-energized for whatever predetermined time delay that is selected, the lower set of contacts 73 of the time delay relay 72 close so that capacitor 67 may discharge through the coil 59 of the second trip means 58 and thereby release the general toggle latch 23 and open the interrupter under the influence of opening spring 17 as in the case of an overload.

The interrupter is also provided externally with a selector switch 78 which may be operated in accordance with positions of the main interrupting switch means 8 through any suitable mechanical means. The illustrated selector switch 78 has two sets of contacts designated by the reference letters "a" and "b." Contact "a" is closed when the main switches 8 of the interrupter are closed and contact "b" is open when the main switches of the interrupter are closed. As illustrated, contact "a" is closed and the circuit through trip coil 59 would be complete to capacitor 67 except that timed delay relay contact 73 is open as long as voltage is sustained on lines 3.

It will be observed that when the interrupter is closed as shown, and the time delay relay 72 is in its uppermost position, that the circuit from the secondary of transformer 68 through the coil 61 of blocking relay 60 is incomplete because of "b" contacts of the selector switch 78 being open. Now if the interrupter opens in response to a fault, selector switch 78 will transfer and close the "b" contact for completing the circuit through blocking relay coil 59 and detent 63 will be retracted when the interrupter is open so that the blocking relay will not interfere with the action of reclosing switch 33. However, each time the interrupter returns to its closed position, coil 61 of the blocking relay is again deenergized by opening of the "b" contact so as to avoid the heating incident to keeping it energized. It will be seen that during normal circuit conditions, and upon occurrence of a fault which would cause the interrupter to open and reclose repeatedly, the shunt trip relay 58 and the blocking relay 60 have no effect since the former is only energized after a time delay period following disappearance of line voltage and the latter is always properly energized only when the interrupter is open.

An alternative to tripping the interrupter during an outage by means of a charged capacitor auxiliary source is to do the same by means of an independent source such as that suggested by the broken lines 80 in the lower left portion of Fig. 2. Certain customers may find it convenient to trip from an independent power source when available such as in substation installations where common control voltage source is used to operate relays and other equipment. If this means of tripping, when lines or bus 3 is dead, is elected, capacitor 67, rectifier 71, charging resistance 70, and instantaneous relay 69 may be eliminated so that the independent source of power 80 may be fed directly to the second trip means by way of the lower contacts 73 of the time delay device 72.

The circumstances accompanying loss of voltage on the power source for an extended period of time and picking up the load by means of a number of interrupters such as that here illustrated will now be recapitulated:

(1) Assume, as shown in Fig. 1, that the interrupter is latched closed and prepared to execute opening and reclosing operations if a fault should occur on the load lines 5.

(2) Power fails on the source feeder lines 3, the interrupter remains closed.

(3) Relay 69 opens instantaneously and isolates capacitor 67 from transformer 68.

(4) Time delay relay 72 opens its contacts 74 and closes its contacts 73 after the selected interval of time.

(5) Capacitor 67 discharges through the closed "a" contact of selector switch 78 and trip coil 59 thereby tripping the interrupter open.

(6) The interrupter is opened: "a" contact of the selector switch 78 opens to break the circuit through trip coil 59 and "b" contact of the selector closes in the blocking relay coil 61 circuit. The blocking relay 60, being de-energized, restrains reclosing switch 33 open.

(7) Power is restored: Instantaneous relay 69 begins to charge capacitor 67 immediately and the capacitor cannot discharge because "a" contact, in circuit with the trip coil 59, is open when the interrupter is open.

(8) Time delay relay 72 closes its contact 74 after the selected time interval following return of voltage on delay coil 75 and this energizes the blocking relay 61 causing it to release the reclosing switch 33 and permit reclosing of the interrupter.

(9) The interrupter recloses: "a" contact in selector switch 78 recloses to ready trip coil 59 for the next extended outage and "b" contact of selector 78 opens to remove power from the blocking relay coil 61. The interrupter is now prepared to carry out its normal fault protecting function.

If the interrupter is tripped from an independent source such as 80, the above sequence is modified to the extent that capacitor 67 and instantaneous relay 69 and their functions may be eliminated, in which case application of power to tripping coil 59 is controlled exclusively by the condition of contact 73 in the time delay relay 72.

It will be appreciated that the time delay device 72 may be adjusted so that it permits reclosing the interrupter at any predetermined time interval following restoration of voltage to the power line and so it permits tripping after any interval following loss of voltage. Tripping open is time delayed in order to preclude the interrupter from opening during short duration outages that would not affect loss of load diversity appreciably. Thus, where the power line takes the form of a common bus fed from a single generating source a number of such interrupters may be connected to the bus for supplying a plurality of individual loads and the time delay devices will each be adjusted for different resetting times so that the various loads are energized consecutively following restoration of voltage on the bus. Therefore, the source will not be unduly burdened by the accumulation of inrush currents which follows initially re-energizing a load circuit following an extended outage period.

It is readily apparent that the interrupters may be arranged to connect various line sections in series with each other so that the loads connected to the line section nearest the source may be energized first and after which the next subsequent interrupter will time out and energize the next load section. By this means the total load may be imposed on the source in series increments which have attained diversity during the time delay period.

Although the adaptation of a reclosing circuit interrupter for picking up load in steps after an extended outage has been described in connection with a polyphase interrupter that opens by the unlatching action of series overload relays on a spring-biased toggle latch and recloses by an electromagnet, it will be understood that the invention may be applied to any circuit breaker such as one that both opens and recloses by power derived from a stored energy spring or where any other form of reclosing mechanism is employed. Those versed in the art will recognize that the general idea of adapting a repeating interrupter to trip open on loss of voltage by applying an auxiliary voltage and to eliminate the effect of the structure and circuits for that purpose on the normal fault protecting duty of the interrupter may be variously embodied. Therefore, the disclosure is to be construed as suggestive rather than limiting and the invention is to be measured by the claims which follow.

I claim:

1. A load pickup repeating circuit interrupter comprising a biased open switch means for connecting a load to a power line, switch opening means and switch reclosing means, latch means holding said switch means closed under normal circuit conditions, overload responsive first trip means arranged to release said latch means and render said opening means effective, said reclosing means being rendered effective upon separation of said switch means, a second trip means adapted to release said latch means after a predetermined time following disappearance of voltage from said power line, an auxiliary power source, time delay relay means having one position corresponding with appearance of voltage on the power line and being movable to another position after said predetermined time following disappearance of voltage, said time delay relay means having a normally closed contact connected to the power line and a normally open contact connected to the auxiliary source, blocking relay means which when energized through said closed contact render said reclosing means repeatedly effective following switch openings due to repeated overload responses and which when de-energized due to movement of said time delay relay means to another position renders said reclosing means ineffective until power is restored for a predetermined time, said second trip means being energized from said auxiliary source through said normally open contact after said predetermined time, whereby said interrupter will trip and remain open when voltage disappears from said power line for a time in excess of the normal reclosing time due to overload responses of said interrupter.

2. A load pickup repeating circuit interrupter comprising biased open switch means for connecting a load to a power line, switch opening means including a spring operatively connected to the switch means, switch reclosing means, latch means holding said switch means closed, under normal circuit conditions, overload responsive first trip means including a relay in series with said switch means and arranged to release said latch means and render said opening means effective when overload current flows to the load, said reclosing means being rendered effective upon separation of said switch means, a second trip means adapted to release said latch means, an auxiliary power source, time delay means responding to disappearance of voltage from said power line for a predetermined time by connecting said second trip means to said auxiliary source whereby said interrupter may trip open, selector switch means in series with said second trip means, said selector switch means being adapted to disconnect said second trip means upon tripping of said interrupter, and blocking relay means controlled by the time delay means for rendering said reclosing means ineffective for a predetermined period following re-appearance of voltage on said power line, said blocking relay means rendering said reclosing means effective when said interrupter opens in response to overloads.

3. A polyphase load pickup repeating circuit interrupter comprising biased open switch means in each phase for connecting a load to a power line, switch opening means and switch reclosing means, common latch means holding said switch means closed under normal circuit conditions, overload responsive first trip means including a relay in series with each switch means and arranged to release said latch means and render said opening means effective, said reclosing means being rendered effective upon separation of said switch means, a second trip means including a relay adapted to release said common latch means, an auxiliary power source including a capacitor normally charged from said power line and an instantaneous relay isolating said capacitor from the line when voltage disappears therefrom, a time delay relay means responding after a predetermined time following disappearance of line voltage by connecting said second trip means to said capacitor whereby discharge of the latter through the relay in the second trip means will trip said interrupter open, blocking relay means which when de-energized renders said reclosing means ineffective and which is normally energized by said time delay means before disappearance of line voltage, said blocking relay means being rendered ineffective to prevent reclosure after a time delay period following re-appearance of voltage on said power line.

4. A polyphase load pickup repeating circuit interrupter comprising biased open line switch means in each phase for connecting a load to a power line, switch opening means and switch reclosing means, common latch means holding said switch means closed under normal circuit conditions, overload responsive first trip relay means arranged to release said latch means and render said opening means effective, said reclosing means being rendered effective upon separation of said line switch means, a second trip relay means adapted to release said latch means, an auxiliary power source including a capacitor and a rectifier means through which said capacitor may be charged, time delay relay means responding after a predetermined time following disappearance of line voltage by connecting said capacitor to discharge through the second trip relay means whereby said interrupter may trip open, selector switch means having at least two sets of contacts responsive to the position of said line switch means, one set of contacts opening circuit to said second trip relay means when the switch means opens and the other set of contacts closing another circuit when the switch means opens, said time delay relay means maintaining said other circuit open when said switch means are open, blocking relay means in said other circuit, said blocking relay means rendering said reclosing means effective following switch opening in response to overload tripping and rendering said reclosing means ineffective following opening in response to said second trip means, said time delay means responding after a period following restoration of line voltage by completing said other circuit and thereby rendering said blocking relay means ineffective, whereupon said interrupter may reclose.

5. A load pickup repeating circuit interrupter comprising separable switch means for connecting a load to a power line, spring means biasing said switch means toward open position, latch means holding said switch means closed in opposition to said spring means under normal circuit conditions, overload relay trip means in series with said switch means and adapted to release said latch means and open said switches successively in response to overload, switch reclosing means normally effective to close said switch means following each of a plurality of quick opening operations, cumulative lockout means adapted to render said reclosing means ineffective after a number of closely successive opening operations, an electromagnetic second trip relay means adapted to release said latch means following de-energization of said power line for a predetermined time in excess of the reclosing time of the switch means when responding to overloads, an auxiliary power source, a time delay relay means for energizing said second trip means from said auxiliary source and deactivating said reclosing means after said predetermined time, whereupon said interrupter may trip and remain open, said time delay relay means again activating said reclosing means a predetermined time period following re-energization of said power line.

6. A load pickup repeating circuit interrupter comprising main switch means for connecting a load to a power line, opening spring means biasing said main switch means toward separation, latch means holding said main switch means closed in opposition to said spring means under normal circuit conditions, reclosing means including a reclosing switch and a shunt electromagnet supplied from the power line, said reclosing switch being arranged to energize said electromagnet and reload said opening spring means and reset said main switch means in response to opening of the main switch means, overload relay means adapted to release said latch means and trip said interrupter open successively, cumulative means including lockout means for de-activating said reclosing switch after a plurality of closely successive interrupter operations, a blocking relay including detent means normally biased toward engagement with said reclosing switch, said detent means engaging when said blocking relay is de-energized, selector switch means having a contact open when said main switch is closed and closed when said main switch is open, said contact being in series with said blocking relay, an auxiliary power source, a time delay relay means responsive to voltage on the power line and having a contact in series with the blocking relay, whereby said blocking relay may be intermittently energized when the interrupter is open during overload response and before lockout, a second trip means adapted to be energized from said auxiliary source following expiration of said predetermined time, said second trip means releasing said latch means and opening said interrupter and engaging said detent means.

7. A load pickup repeating circuit interrupter comprising separable switch means for connecting a load to a power line, spring means biasing said switch means toward open position, latch means holding said switch means closed in opposition to said spring means under normal circuit conditions, overload relay trip means in series with said switch means for releasing said latch means and opening said switch means in response to an overload, switch reclosing means normally effective to close said switch means following each of a plurality of quick opening operations, cumulative lockout means for rendering said reclosing means ineffective after a number of closely successive opening operations, an electromagnetic second trip relay means for releasing said latch means following the de-energization of said power line for a predetermined time in excess of the reclosing time of said switch means when responding to overloads, an auxiliary power source including a capacitor charged from said power line under normal circuit conditions and an instantaneous relay for disconnecting said capacitor from said power line in response to loss of voltage therein, a time delay relay means for connecting said second trip means to said capacitor and for de-activating said reclosing means after said predetermined time, following the de-energization of said power line, whereupon said interrupter may trip and remain open, said time delay relay means again activating said reclosing means a predetermined time following re-energization of said power line.

8. A load pickup repeating circuit interrupter comprising main switch means for connecting a load to a power line, opening spring means biasing said main switch means toward separation, latch means holding said main switch means closed in opposition to said spring means under normal circuit conditions, reclosing means including a reclosing switch and a shunt electro-magnet supplied from the power line, said reclosing switch being arranged to energize said electro-magnet and re-load said opening spring means and reset said main switch means in response to opening of the main switch means, overload relay means for releasing said latch means and tripping said interrupter open successively in response to an overload, cumulative lockout means for de-activating said reclosing switch after a plurality of closely successive interrupter operations, a blocking relay including detent means normally biased into engagement with said reclosing switch, to prevent the reclosure thereof when said lockout relay is de-energized, selector switch means having a contact in series with said blocking relay and which is open when said main switch is closed and closed when said main switch is open, an auxiliary power source including a capacitor charged from said power line under normal circuit conditions and an instantaneous relay for disconnecting said capacitor from said power line in response to a loss of voltage therein, a time delay relay means responsive to voltage on the power line and having a contact in series with the blocking relay, whereby said blocking relay may be intermittently energized when the interrupter is open and prior to lockout, a second trip means adapted to be energized from said auxiliary source following expiration of said predetermined time, said second trip means releasing said latch means and opening said interrupter and engaging said detent means.

9. A repeating circuit interrupter comprising switch means for interrupting an electrical system, a first switch opening means for opening said switch means upon the occurrence of an overload in said system, switch closing means, means for rendering said switch closing means operative after an opening operation of said switch means, a second switch opening means, normally ineffective blocking means for preventing the operation of said switch closing means, time delay means coupled to said system and responsive to the disappearance of voltage therefrom for rendering said second switch opening effective after a predetermined time delay following said voltage disappearance whereby said switch means is opened and also for rendering said blocking means effective to prevent the reclosure of said switch means after the opening thereof by said second switch opening means, said time delay means also being responsive to the reappearance of system voltage to again render said blocking means ineffective after the expiration of a second time delay period following said voltage reappearance, so that said switch means may again be reclosed.

10. A repeating circuit interrupter comprising switch means for interrupting an electrical system, a first switch opening means for opening said switch means upon the occurrence of an overload in said system, switch reclosing means, means for rendering said switch reclosing means operative after an opening operation of said switch means, a second switch opening means, an auxiliary power source, normally ineffective blocking means for preventing the operation of said switch reclosing means, time delay relay means coupled to said system and responsive to the voltage therein, said time delay relay means being operable to a first position upon the disappearance of voltage from said system wherein it connects said second switch opening means to said auxiliary power source and also renders said blocking means effective to prevent reclosing of said contacts, said time delay relay means also being operable to a second position upon the reappearance of voltage in said system wherein said second switch opening means is disconnected from said auxiliary power source and said blocking means is rendered ineffective, movement of said time delay relay means between said positions being time delayed.

11. A repeating circuit interrupter comprising switch means for interrupting an electrical system, a first switch opening means for opening said switch means upon the occurrence of an overload in said system, switch reclosing means, means for rendering said switch reclosing means operative after an opening operation of said switch means, a second switch opening means, an auxiliary power source, blocking relay means operable to prevent the reclosing of said switch means upon being de-energized, time delay relay means coupled to said system and responsive to the voltage therein, said time delay relay means having normally open contacts disposed between said auxiliary source of power and normally closed contacts disposed between said blocking relay means and said system so that second switch opening means is normally de-energized and said blocking relay means is normally energized whereby it is ineffective to prevent the reclosing of said contacts following an opening operation thereof, said time delay relay means being operable upon the disappearance of said system voltage to move its contacts to their alternate positions after a time delay so that said switch means are opened and said blocking is rendered effective to prevent reclosure thereof, said time delay relay means also being operative upon the reappearance of said system voltage to return said contacts to their normal positions after a time delay so that said switch means may reclose.

12. A repeating circuit interrupter comprising switch means for interrupting an electrical system, a first electro-responsive switch opening means coupled to said system and responsive to an overload for opening said switch means, switch reclosing means, means for rendering said switch closing means operative after an opening operation of said switch means, a second electro-responsive switch opening means, an auxiliary power source including a capacitor normally charged from said system, blocking relay means operative to prevent the reclosing of said switch means upon being de-energized, time delay relay means coupled to said system and responsive to the voltage therein, said time delay relay means having normally open contacts disposed between said auxiliary source of power and normally closed contacts disposed between said blocking relay means and said system so that said second switch opening means is normally de-energized and said blocking relay means is normally energized whereby it is ineffective to prevent the reclosing of said contacts following an opening operation thereof, siad time delay relay means being operative upon the disappearance of said system voltage to move its contacts to their alternate positions after a time delay, so that said second electro-responsive switch opening means is connected to said capacitor whereby said switch means are opened and said blocking means is rendered effective to prevent reclosure, said time delay relay means also being operative upon the reappearance of system voltage to return said contacts to their normal positions after a time delay, so that said blocking means is again rendered ineffective to prevent reclosure of said switch means.

References Cited in the file of this patent

UNITED STATES PATENTS

| | | |
|---|---|---|
| 2,482,524 | Vrooman | Sept. 20, 1949 |
| 2,776,393 | Easley | Jan. 1, 1957 |
| 2,852,638 | Stramowski | Sept. 16, 1958 |